March 24, 1936.     T. W. HALLERBERG     2,035,157
AUTOMATIC LUBRICANT DISTRIBUTING APPARATUS
Filed Dec. 7, 1931     2 Sheets-Sheet 1
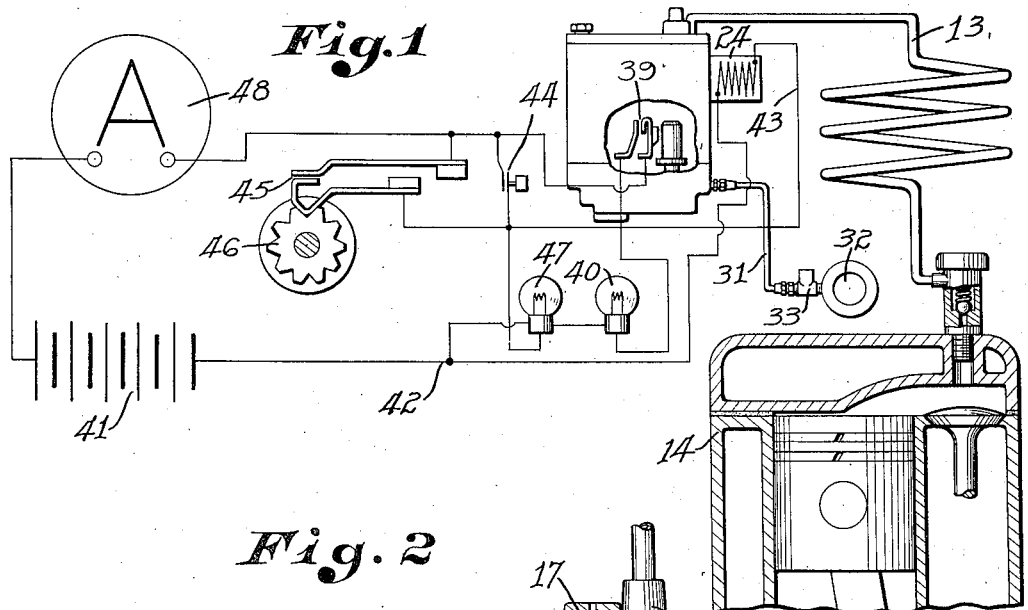
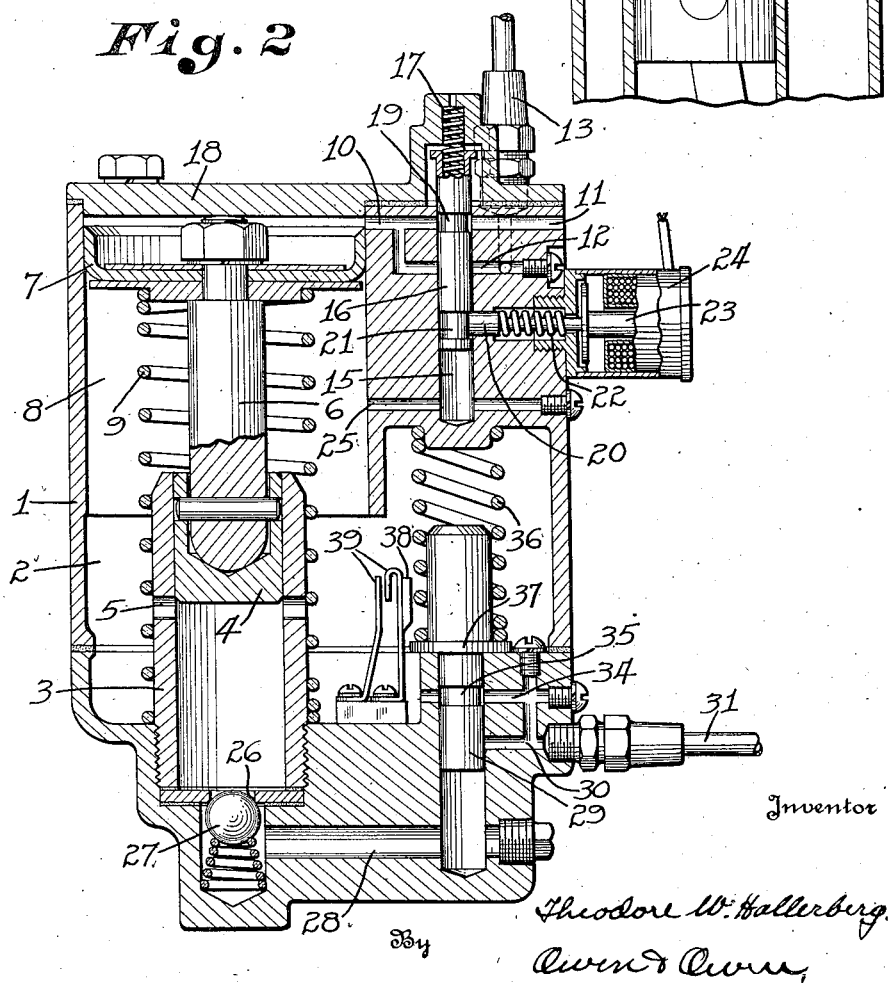
Inventor
Theodore W. Hallerberg
By
Owen & Owen
Attorney March 24, 1936.   T. W. HALLERBERG   2,035,157
AUTOMATIC LUBRICANT DISTRIBUTING APPARATUS
Filed Dec. 7, 1931   2 Sheets-Sheet 2

Inventor
Theodore W. Hallerberg
By Owen & Owen
Attorney

Patented Mar. 24, 1936

2,035,157

UNITED STATES PATENT OFFICE 2,035,157

AUTOMATIC LUBRICANT DISTRIBUTING APPARATUS

Theodore W. Hallerberg, St. Louis, Mo., assignor, by mesne assignments, to The Commerce Guardian Bank, Toledo, Ohio, trustee Application December 7, 1931, Serial No. 579,639

3 Claims. (Cl. 184—29)

This invention relates to lubricant distributing apparatus, and particularly to those of the centralized type adapted for use in connection with motor cars, trucks, busses, industrial machines, or the like, and is operable to supply lubricant under pressure to one or more of the bearings thereof.

The primary object of the invention is the provision of a novel apparatus of this character, which is periodically operable by automatic means to force lubricant to the bearing parts with which connected, whereby such bearings are maintained in a properly lubricated state.

A further object of the invention is the provision of an apparatus of the class described which is pneumatically operable and electrically controlled to perform its desired lubricating functions.

Further objects and advantages of the invention will be apparent from the following description.

The invention is fully described in the following specification, and while in its broader aspect it is capable of embodiment in various forms, one embodiment thereof and modifications of certain features thereof are illustrated in the accompanying drawings, in which—

Figure 3:
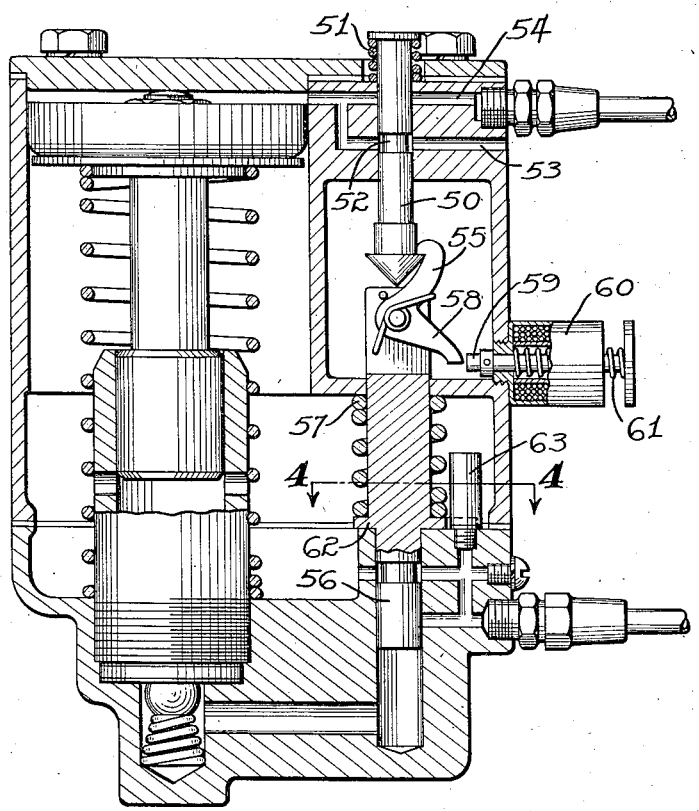
Figure 4:
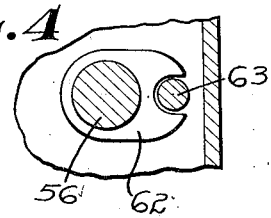

Figure 1 is a diagram of a complete operative apparatus embodying the invention. Fig. 2 is a vertical section of the compressor unit of the apparatus with parts in full, and with the operating parts shown in normal positions. Fig. 3 is a similar view of a modified form of the compressor unit, and Fig. 4 is a section on the line 4—4 in Fig. 3.

Referring to the drawings, and particularly to the compressor unit shown in Fig. 2, I designates the body of said unit, which is provided interiorly with a chamber 2 for receiving the lubricant to be distributed. Rising within the chamber 2 from the bottom thereof is a pump cylinder 3 having a plunger 4 operating therein and having communication near its upper end with the lubricant chamber 2 through one or more side ports 5. These ports are uncovered by the plunger 4 when at the limit of its up stroke.

The plunger 4 is connected by a rod 6 to a piston 7 operating in a cylinder 8 provided in the upper end of the lubricant chamber 2 at one side thereof. A coiled compression spring 9 is interposed between the piston 7 and the bottom of the lubricant chamber 2, in the present instance in encircling relation to the cylinder 3, and acts to normally maintain the piston and plunger 4 at the upper ends of their strokes.

The upper end of the piston chamber 8, above the piston 7, has a port 10 in communication therewith, which port has communication with the atmosphere through an exhaust passage 11 and has communication with a source of fluid pressure supply through a passage 12 and tube 13, which latter leads to any suitable source of fluid pressure supply, such, for instance, as an air compressor, if such a compressor is handy, or to the compression end of one cylinder 14 of an associated motor. For instance, if a machine with which the lubricant distributing apparatus is associated, is a motor truck or bus equipped with an air compressor for operating the brakes, or for other purposes, the fluid supply tube 13 may be connected with the air compressor or air storage in association therewith; otherwise, the tube 13 may be connected to the compression end of one of the cylinders of the associated motor.

The passages 11 and 12 are intercepted by a bore 15 in which a valve 16 is mounted for reciprocatory movements, and which is urged to normally move to the lower end of its stroke by a compression spring 17 mounted in a recess provided in the cover 18, which is mounted on the body 1 and closes the tops of the lubricant chamber 2 and cylinder 8. The valve 16 is provided with an annular recess 19, which, when the valve is at the upper end of its stroke, registers with the exhaust passage 11 to open the inner end of such passage to the atmosphere, and when the valve is at the lower end of its stroke, registers with the passage 12 to open the inner end of such passage to the source of fluid pressure supply. The valve 16 is held at the upper end of its stroke with the recess 19 in communication with the exhaust passage 11 by a lock pin 20 entering a recess 21 in the valve 16 under the urge of a spring 22 encircling the stem of the pin 20.

The stem of the pin 20 is connected at its outer end to the core member or armature 23 of a solenoid 24, whereby the energizing of the solenoid effects a retraction of the pin 20 against the tension of the spring 22 and permits the valve plunger 16 to lower under the action of the spring 17, thus closing the exhaust passage 11 and opening the fluid supply passage 12 to the cylinder 8. The solenoid 24 is controlled as hereinafter described.

The lower end of the bore 15 is in communication through a passage 25 with the interior of the cylinder 8 at a point just above the limit of the down stroke of the piston 7, so that when such piston has reached the limit of its plunger-actuating movement, the fluid pressure in the cylinder above the piston is admitted to the bore 15 below the valve 16, and acts on the latter to return it to the exhaust-opening position shown in Fig. 2, and to permit the pin 20 to again enter the recess 21 and retain the valve in such position.

Upon a down stroke of the plunger 4, the lubricant within the bore of the cylinder 3 is forced therefrom through the outlet port 26 in the bottom of the cylinder past the check-valve 27 and through the outlet passage 28 and against the plunger valve 29 in said passage, forcing said valve outward to uncover the passage 30, which has communication through a tube 31 with the bearing or series of bearings to be lubricated. One of these bearings is indicated at 32 in Fig. 1, and the tube 31 communicates therewith through a control unit 33, as well understood in the art.

The passage 30 has a by-pass 34 extending therefrom to the interior of the lubricant-supply chamber 2, and this by-pass is open through a registering recess 35 in the valve 29, when said valve is in its normal position, as shown in Fig. 2. It is thus apparent that when the valve 29 is in normal position in which it closes the passage 30, any back pressure in said passage is relieved to the chamber 2 through the by-pass 34. When the supply line has been filled with lubricant, a back pressure is set up in the line causing the valve 29 to continue to raise under the lubricant feeding pressure until it has uncovered the by-pass 34 to the portion of the passage 28 in which the valve operates, thus permitting the lubricant to be forced back into the supply chamber 2. When the valve 29 is in its feed passage closing position, as shown in Fig. 2, the lubricant in the feed end of said passage is permitted to seep slowly past the valve and through the by-pass 34, into the lubricant-supply chamber, thus relieving the pressure in the passage 28. When the plunger 4 returns to its normal raised position, a sufficient vacuum is created in the bore of the cylinder 3 to draw a charge of lubricant therein from the supply-chamber 2 through the ports 5, as is apparent.

The valve 29 is normally held in lowered position by a coiled compression spring 36, which acts at one end against a stop collar 37 on the valve and at its other end against a registering portion of the body 1.

When the valve 29 is raised, the shoulder 37 coacts with an insulating block 38 on the movable member of an electric switch 39 and effects a closing of such switch. This switch is in circuit with a signal device 40 (Fig. 1), as hereinafter described, so as to notify the attendant that the apparatus is operating.

The solenoid 24 is in circuit with a source of electrical supply, such, for instance, as a battery 41, one solenoid lead being designated 42 and the other 43. The lead 43, in the present instance, has both a manually controlled switch 44 and an automatically controlled switch 45 in circuit therewith, so that the closing of either switch will effect a closing of the solenoid circuit. The automatic switch 45 may be actuated by any suitable automatically operated means indicated diagrammatically at 46, and this means may be actuated by a time-controlled element, or by an element such as a speedometer that is operated by the running of the mechanism with which the lubricant-feed apparatus, is associated. For instance, if the periodical operation of the lubricating apparatus is to be determined by mileage run of the truck, or associated mechanism, one of the discs of the associated speedometer may have a notched wheel, such as indicated at 46, connected thereto to turn therewith, and such notched wheel may have engagement with one member of the switch 45, so that at each movement of the wheel a predetermined extent, the switch will be momentarily closed. During this closing of the switch, the solenoid will be energized to release the lock-pin 20 from the valve 16 permitting the valve to move to close the exhaust passage 11 and open the fluid-supply passage 12 to the upper end of the cylinder 8. It will be understood that while I have specifically referred to the control means for the switch 45 as being actuated by the movement of a speedometer element, it is not intended to restrict the periodical operating means for the switch to any specific type of control. It will also be understood that the term "periodical" or similar term, as employed herein in connection with the operating of the apparatus, does not necessarily refer to a time element, but applies broadly to an intermittent operating means irrespective of how the length of the period between operations is determined.

47 designates a signal device, such, for instance, as an electric lamp, that is connected across the leads 42 and 43, so that its circuit will be closed when either switch 44, 45, is closed, thus indicating to the attendant the closing of the operating circuit. The purpose of the signal 40, is to indicate if the compressor means is operating. If electric lamps are used for the signal means 40, 47, these lamps may be of different colors, so that the attendant may readily determine the operation by whichever lamp is on. 48 designates an ammeter in one of the leads between the solenoid and battery.

In the modification of the compressor unit, illustrated in Fig. 3, the operation and general construction is substantially the same as described in connection with Fig. 2, except that as to the movement of the fluid pressure control valve and the control means therefor. In the modified form, the fluid pressure control valve is designated 50 and is normally moved upward by a compression spring 51. The recess 52 in the valve is in register with the exhaust passage 53, and the fluid pressure supply passage 54 is closed when the valve is down, and the reverse action is present when the valve is up. The valve 50 is held in lowered position by a catch 55 engaging over a shoulder at the lower end thereof, said catch being carried by the upper extended end of the lubricant control valve 56, which latter is normally held in lowered position, the same as in the other form, by a spring 57. The catch member 55 is spring actuated to engage the shouldered end of the valve 50 and has a tail-piece 58, which, when the parts are in the position shown in Fig. 3, stands in register with the inner end of the solenoid-actuated plunger 59. When the solenoid 60 is energized, the plunger 59 is actuated to move inwardly and effect a tripping of the catch member 55. A spring 61 normally retains the plunger 59 in its outward position of movement.

After the valve 50 has been released and permitted to move upward, the upward movement of the valve 56 under the discharging pressure of the lubricant is sufficient to raise the catch member 55, so as to again engage the shoulder at the lower end of the valve 50, thus causing the valve 56, when lowering to normal position, to return the valve 50 to its lowered or exhaust position.

The shouldered collar 62 on the valve 56 has notched engagement at one side with a pin 63 to prevent turning of the valve 56 and consequent moving of the tail-piece 58 out of register with the operating stem 59. The leakage of lubricant under pressure past the compressor plunger and the valve 56 is sufficient to permit a return of the valve 56 to its normal position under the action of the spring 57.

In the operation of the device, referring particularly to Figs. 1 and 2, the switch 45, when closed by the automatic means, effects an energizing of the solenoid 24 and a consequent withdrawal of the pin 20 from locking engagement with the fluid pressure control valve 16, thus permitting such valve to move downward under the action of the spring 17 and close the exhaust passage 11 and open the fluid pressure supply passage 12. The admission of fluid pressure to the upper end of the cylinder 8, causes a lowering of the piston 7 and a consequent down stroke of the plunger 4, thereby forcing the lubricant from the bore of the pump cylinder 3 and through the outlet passage 28 against the end of the lubricant control valve 29. The pressure against the valve 29 raises it sufficiently to uncover the outlet feed passage 30, so that the lubricant under pressure may be distributed to the connected bearings. When the piston 7 has moved downward past the passage 25, live fluid pressure is admitted to the lower end of the bore 15 and acts against the lower end of the valve 16 to return it against the tension of the spring 17 to catch engagement with the lock-pin 20 and to close the live fluid passage 12 and open the exhaust passage 11. At each closing of the solenoid circuit, this cycle of operations is repeated. Upon the closing of said circuit, the signal 47 is actuated and when the control valve 29 has raised to permit a discharge of the lubricant through the outlet passage 30, the collar 37 on said valve will have engaged the insulating block 38 and closed the switch 39 in circuit with the signal 40, thus indicating to the attendant that the device is properly functioning.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. In a lubricant distributing apparatus, a lubricant pump, an element normally standing in one position and having predetermined movements imparted thereto by the pump actuated lubricant, fluid operated means for operating the pump, a control for said means including a reciprocally movable member normally movable to a position in which operating fluid is admitted to said means, trip means for holding said member in position to prevent admission of operating fluid to said first means and automatically operable at predetermined intervals to release said member, a portion of said trip means being carried by said element and actuated by predetermined movement of the element to engage and move said member to position to prevent admission of operating fluid to the first means.

2. In a lubricant distributing apparatus, a lubricant pump, an element normally standing in one position and having predetermined movements imparted thereto by the pump actuated lubricant, fluid operated means for operating the pump, a control for said means including a reciprocally movable member normally movable to a position in which operating fluid is admitted to said means, trip means carried by said element and adapted to engage said control member to hold the latter in position to prevent admission of operating fluid to said first means, and electrical means including a solenoid periodically operable to release said catch means from said member, said catch means being again engaged with the control member by predetermined movements of said element.

3. In a lubricant distributing apparatus, a lubricant pump, an element normally standing in one position and having predetermined movements imparted thereto by the pump actuated lubricant, fluid operated means to operate the pump, a control means for said pump operating means including a member biased to stand in a position in which fluid is admitted to said pump, trip means to hold said control means in position to prevent the admission of operating fluid to said pump, a portion of said trip means being carried by said element and actuated by predetermined movements of the element to engage said member and move it to said last named position.

THEODORE W. HALLERBERG.